United States Patent [19]

Townsend et al.

[11] 4,230,290
[45] Oct. 28, 1980

[54] AIRPLANE ANGLE OF ATTACK AND DIRECTION OF FLIGHT INDICATOR

[75] Inventors: Ray T. Townsend, Des Moines, Iowa; Orville Vandewege, Tempe, Ariz.

[73] Assignee: Townsend Engineering Company, Des Moines, Iowa

[21] Appl. No.: 901,717

[22] Filed: May 1, 1978

[51] Int. Cl.[2] .................... B64D 43/00; B64D 45/00
[52] U.S. Cl. ..................... 244/1 R; 73/180; 116/265; 250/231 R; 350/96.24; 356/383; 340/27 AT
[58] Field of Search .............. 244/1 R; 73/178 T, 180; 116/124 C, 124 F, 126, 129 L, DIG. 3, 129 P, 28, 117 D, 124.4; 33/328, 329, 330, 282, 348; 250/231, 56 O; 350/96.24–96.27; 356/375, 383, 384, 387, 385; 340/27 AT

[56] References Cited

U.S. PATENT DOCUMENTS

| | | | |
|---|---|---|---|
| 1,332,810 | 3/1920 | Danielson | 244/1 R X |
| 3,036,153 | 5/1962 | Day | 350/96.24 X |
| 3,272,174 | 9/1966 | Pribonic | 350/92.24 X |
| 3,566,826 | 3/1971 | Forster | 244/1 R |
| 3,742,233 | 6/1973 | Gorgens et al. | 250/231 R |

FOREIGN PATENT DOCUMENTS

886791  4/1943  France ........................ 73/180

*Primary Examiner*—Galen L. Barefoot
*Attorney, Agent, or Firm*—Zarley, McKee, Thomte, Voorhees & Sease

[57] ABSTRACT

An airplane angle of attack and direction of flight indicator includes a vane on the outside of the fuselage which is pivotally movable in response to changes in the airplane's angle of attack. A group of optical fibers are supported within the airplane with one end positioned for exposure to a light source. A light shield is movable into and out of blocking relation between the light source and optical fibers in response to pivotal movement of the vane. With the opposite ends of the optical fibers arranged in an indicator in the airplane cockpit, the illumination of fibers at the indicator affords a ready indication of the airplane's angle of attack. With the opposite ends of the fiber arranged in vertically spaced relation, a sighting device may be interposed between the pilot and indicator for establishing a line of sight along the actual direction of flight.

20 Claims, 9 Drawing Figures

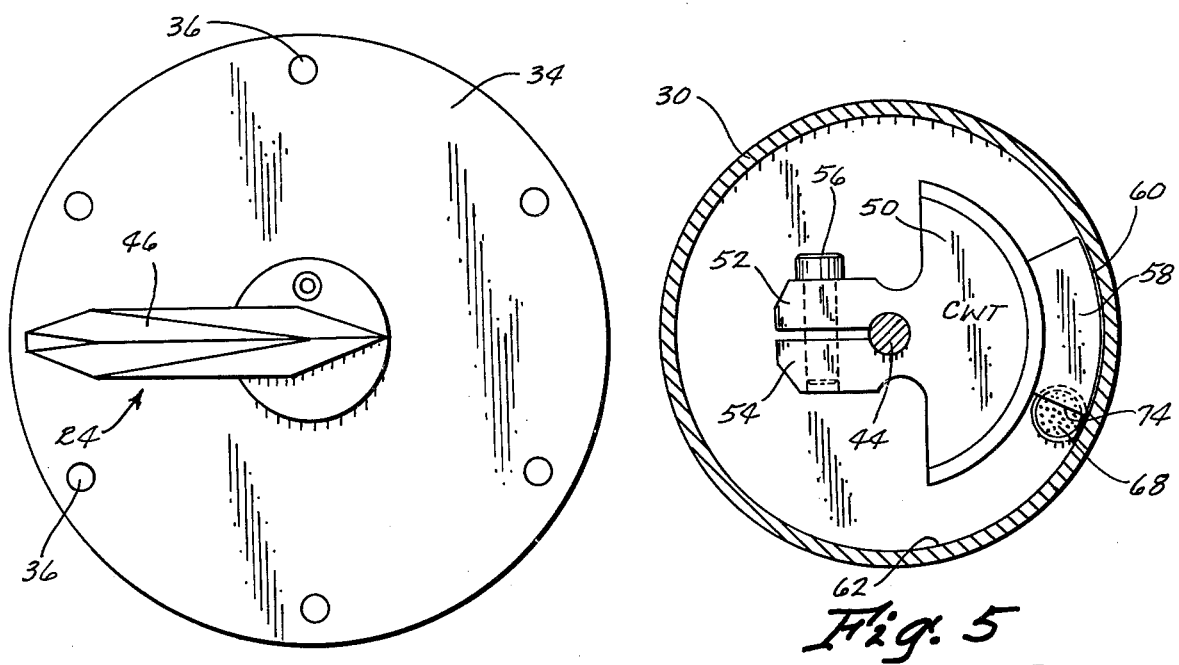
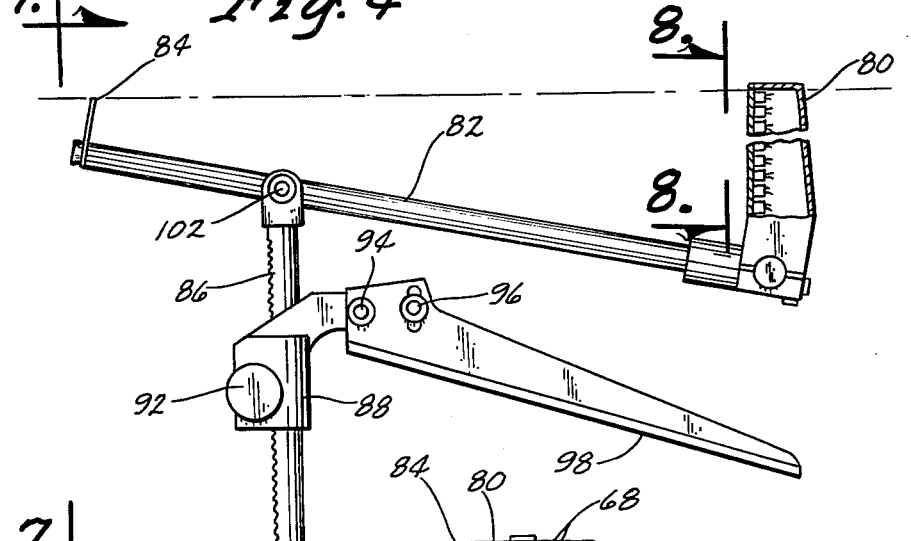
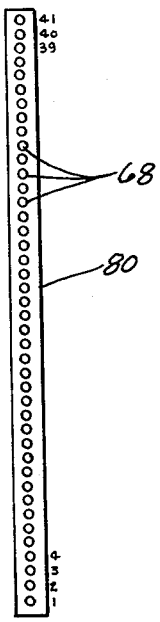
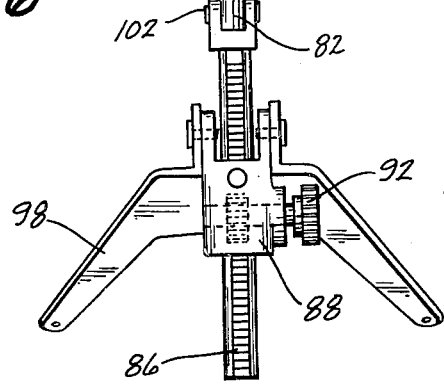
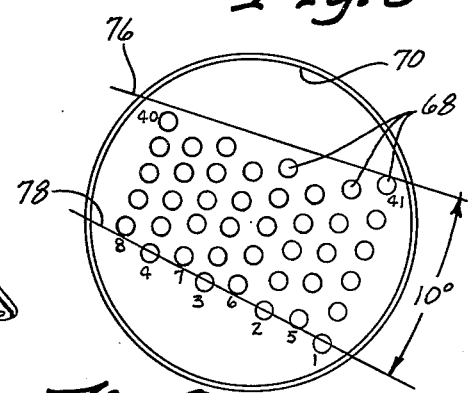

AIRPLANE ANGLE OF ATTACK AND DIRECTION OF FLIGHT INDICATOR

BACKGROUND OF THE INVENTION

This invention relates in general to airplane instrumentation and more particularly to an instrument for indicating the angle of attack and direction of flight of an airplane.

As a plane flies through the air, the wings must have at least a certain minimum pitch relative to the direction of flight in order to create the lift for supporting the weight of the plane. This pitch or angle between the wing center line and direction of flight is known as the angle of attack. Since a wing develops greater lift at higher speeds, the necessary angle of attack at higher speeds is less than at lower speeds. There is thus an inverse relationship between angle of attack and air speed for any particular plane.

Although angle of attack may not be important to a pilot at high speeds, it becomes critical at slow speeds since every airplane has a certain angle of attack at which it goes into a stall. Every plane has a corresponding stall speed but this will vary depending on the loading, turning and banking conditions at the stall angle. Accordingly, the angle of attack provides a consistent indication of the airplane's lift characteristics regardless of the payload or turning angle of the plane.

Heretofore, airplanes have been provided with instrumentation to indicate air speed and elevation but only the most sophisticated and expensive planes have been provided with means for indicating the angle of attack. These include commercial and high performance jets wherein a small airfoil or wind vane is mounted exteriorially to sense the direction of airflow past the airplane. Rotation of the airfoil adjusts a potentiometer which causes a read-out of the instrument panel.

An inherent problem of such devices is the lack of accuracy. The potentiometer contacts necessarily create a certain amount of drag which influences the position of the airfoil. At slower speeds approaching stall speed, the error induced by such drag may be intolerable.

Another problem associated with existing airplane instrumentation is that although measurements of altitude and rate of change of altitude may be provided, there is nothing that visually indicates to the pilot his actual direction of flight. Since the angle of attack of an airplane varies with speed as explained above, the inclination of the airplane fuselage affords no reliable indication of direction of travel. At slow speeds, the plane may be flying level or descending with the fuselage disposed with its nose considerably higher than at cruising speeds.

Furthermore, many airplane accidents are caused by overshooting or undershooting the runway during landing, and this problem is a direct result of not having an instrument to indicate the direction that the plane is flying. Accordingly, to make a final visual approach onto a runway with existing instrumentation, a pilot can only estimate the correct rate of descent which will direct the airplane along a path from its starting position to the approach end of the runway.

SUMMARY OF THE INVENTION

The above-described problems are believed to be solved by the airplane angle of attack indicator of the present invention which operates free of drag associated with presently available devices. In the present invention, the angle of attack information is transmitted from the vane to the instrument panel by fiber optics, thereby affording a simple, dependable and comparatively inexpensive indicator device. A light shield or shutter is arranged to rotate with the wind vane so as to interrupt the light beam between a light source and the ends of a group of optical fibers to a degree associated with the angle of the wind vane. Of course, there is no drag or friction associated with the interruption of a light beam. Similarly, the wind vane and shutter may be supported on the same pivot axis and displaced in opposite directions so as to afford a balanced member free of the biasing effects of gravitational forces.

The opposite ends of the optical fibers terminate at an indicator on the instrument panel so that the number of fibers illuminated affords a ready indication of the airplane's angle of attack. By arranging the fibers at the light source for sequential illumination as the angle of attack is varied, the opposite ends may be vertically arranged in the sequence of illumination and supported relative to a fixed sighting device so as to simultaneously provide a positive line of sight along the airplane's actual direction of flight.

Accordingly, an object of the present invention is to provide an improved airplane angle of attack indicator.

Another object of the invention is to provide an airplane angle of attack indicator having a wind vane supported free of the dragging influence of any measuring equipment which would interfere with its accuracy.

Another object of the invention is to provide an airplane angle of attack indicator wherein information is transmitted from a wind vane to the airplane instrument panel by fiber optics.

Another object of the invention is to provide an airplane angle of attack indicator wherein the signal indicating the angle of attack is amplified at the instrument panel for easy reading by the pilot.

Another object of the invention is to provide an airplane angle of attack indicator which is sensitive enough to measure incremental movements of the wind vane which are substantially less than the diameter of a single optical fiber.

A further object of the invention is to provide an airplane angle of attack indicator wherein the optical fibers are arranged at the instrument panel in vertically spaced relation to one another and in fixed relation to a sighting device, thereby to provide a visual line of sight along the airplane's actual direction of flight.

Finally, it is an object of the invention to provide an airplane angle of attack indicator which is economical to manufacture, durable in use and efficient in operation.

BRIEF DESCRIPTION OF THE DRAWINGS

FIG. 4 is a side elevational view of the wind vane assembly, as seen on line 4—4 in FIG. 3;

FIG. 5 is a side sectional view of the pivotally mounted shutter, as seen on line 5—5 in FIG. 3;

FIG. 6 is a side elevational view of the support structure for the optical indicator and sighting device;

FIG. 7 is a rear elevation view taken along line 7—7 in FIG. 6;

FIG. 8 is a rear elevational view of the optical indicator, taken along line 8—8 in FIG. 6; and FIG. 9 is a side elevational view of the arrangement of the ends of the optical fibers exposed to the light source.

DESCRIPTION OF THE PREFERRED EMBODIMENT

Figure 1:
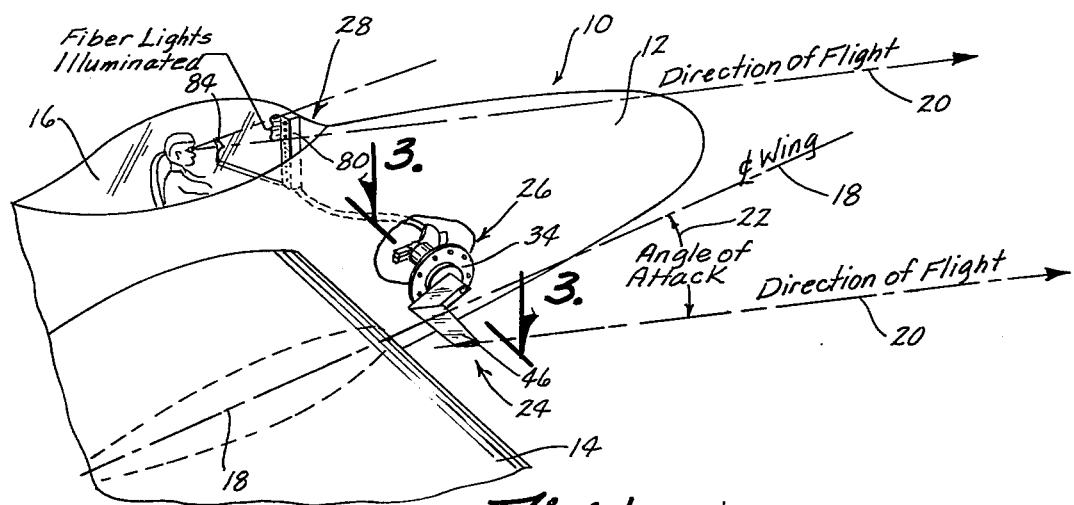
FIG. 1 is a partial perspective view of an airplane including the angle of attack indicator of the present invention.

The numeral 10 refers to a conventional airplane having a fuselage 12, wings 14 and a cockpit area 16. As seen in the drawings, the wing center line is referred to by reference numeral 18 and is the center line through a longitudinal cross-section of the airplane wing. It is seen in FIG. 1 that the airplane's actual direction of flight 20 is disposed at an angle somewhat below the wing center line 18. The angular difference between lines 18 and 20 is referred to as the angle of attack as indicated by arrow 22 in FIG. 1. In other words, this is the angle at which the wings attack the air through which the plane is moving. Similarly, a reference angle could be taken between the pitch of the fuselage and the direction of flight of the airplane.

Figure 3:
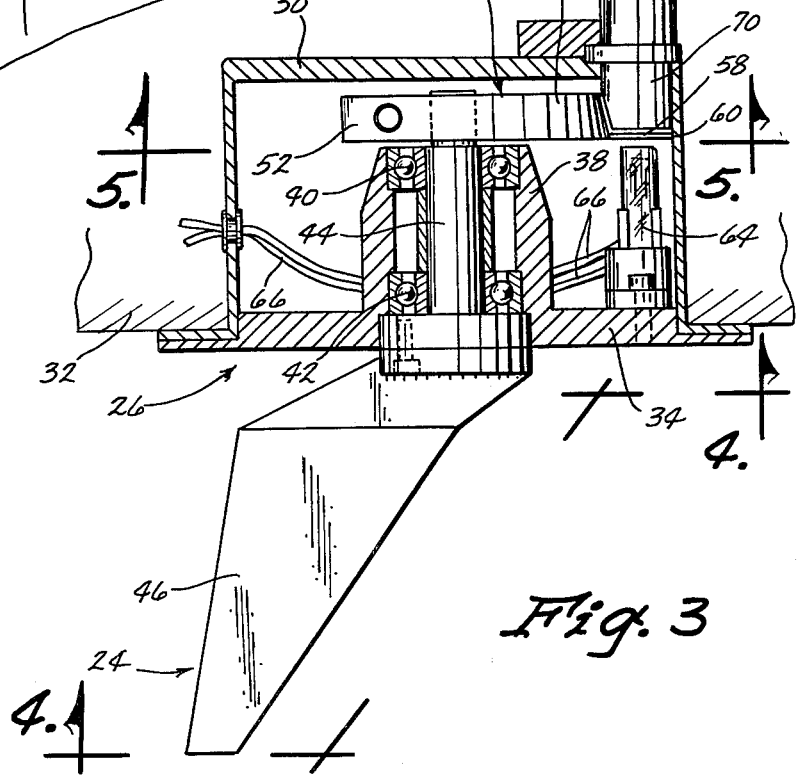
FIG. 3 is a top sectional view of the light shutter and wind vane assembly, as seen on line 3—3 in FIG. 1.

The angle of attack indicator 24 comprises a sensing or sending unit 26 and an indicator unit 28. Referring to FIG. 3, the sending unit 26 includes a housing 30 supported within one side wall 32 of the fuselage 12, said housing being closed exteriorially by a cover plate 34 secured thereto by bolts 36, as shown in FIG. 4. Cover plate 34, as seen in FIG. 3, is provided with a central opening and an inwardly directed cylindrical flange 38 which supports a pair of ball bearing assemblies 40 and 42 in spaced relation therein. A pivot shaft 44, which is rotatably carried within the bearing assemblies 40 and 42, extends outwardly therefrom through the cover plate center opening for supporting a wind vane 46 on the outer end thereof. As seen in FIGS. 3 and 4, vane 46 is a forwardly tapered blade member extended transversely outwardly from the pivot shaft 44 in offset relation from the axis of the shaft. Thus vane 46 is responsive to wind passing thereover to rotate pivot shaft 44 as will be described in detail hereinafter.

A light shield or shutter 48 is mounted on the inner end of pivot shaft 44 within housing 30 for pivotal movement in unison with the vane 46. Referring to FIGS. 3 and 5, shutter 48 includes an arcuate counterweight 50 having a pair of clamp arms 52 and 54 extended therefrom for clamping engagement onto the pivot shaft 44 by means of a clamp screw 56. A flat shutter plate 58 extends radially outwardly from one edge of the counterweight 50 with its free edge 60 disposed in closely spaced parallel relation to the inside surface 62 of housing 30.

A source of light 64 is supported within the housing 30 on one side of the shutter plate 58, as shown in FIG. 3. A pair of electrical leads 66 connect the source of light 64 to a source of electricity within the fuselage.

A plurality of elongated optical fibers 68 are supported in a cluster within a fiber optic receptor 70 with one end of the fibers positioned for exposure to the source of light 64 when not obstructed by the shutter plate 58. The other ends of the fibers 68 are supported at the indicator unit 28 within the cockpit area and in view of the pilot. Thus the optical fibers 68 are adapted to individually receive and transmit light from the light source 64 to the cockpit area 16.

Referring to FIG. 9, it can be seen that the fiber ends are arranged within the receptor 70 in radially spaced apart rows of fibers. The fibers of alternate rows are slightly circumferentially offset relative to one another so that as the leading edge 74 of shutter plate 58 pivotally moves between positions indicated by lines 76 and 78 in FIG. 9, the fibers are sequentially illuminated or shielded one by one. For example, with the leading edge 74 of the shutter plate disposed at line 78, fibers 1 through 4 are illuminated since the ends are at least partially exposed. As the shutter is pivoted slightly counterclockwise as seen in FIG. 5, fiber number 5 will be illuminated and then fibers 6,7,8 etc. sequentially thereafter.

The staggered relation of fibers at the sending unit 26 is a contributing factor to the sensitivity of the invention. In order to be useful in the range of speed used for an approach and landing, it is necessary for the pilot to see even the slightest change in angle of the wind vane 46; even a fraction of a degree. This means another fiber 68 must be exposed in only a fraction of a degree of rotation of the wind vane and shutter assembly. Yet to get adequate light transmitted from the sending unit 26 to the indicator unit 28 requires fibers of approximately ten to thirty thousandths of an inch or more. But a diameter of thirty thousandths of an inch is too large an increment for the vane 46 to move between indications unless the sending unit 26 were much larger than practical. With the fibers circumferentially staggered five to ten thousandths of an inch apart, however, the large diameter fibers can effectively indicate incremental movements of the shutter plate 58 through a distance substantially less than the fiber diameter.

Referring to FIG. 8, it is seen that the other ends of the optical fibers 68 are supported at the indicator unit 28 in a generally upright column within a console or member 80. In other embodiments, the ends of the fibers at the indicator unit 28 may be arranged in any other fashion since it is the number of fibers which are illuminated that provides the indication of angle of attack. The vertically spaced arrangement is preferred however as it may be advantageously utilized to provide an indication of flight direction, as is explained in detail hereinbelow.

Referring to FIGS. 8 and 9, the fibers are arranged on the console 80 in the sequence of illumination as is indicated by the fiber numbers in FIG. 8 corresponding to the fiber numbers shown in FIG. 9. Accordingly, as the leading edge 74 of the shutter plate is pivoted from line 78 to line 76 in FIG. 9, the illumination of fibers proceeds vertically up the console 80 sequentially illuminating fibers 1 through 41.

Figure 2:
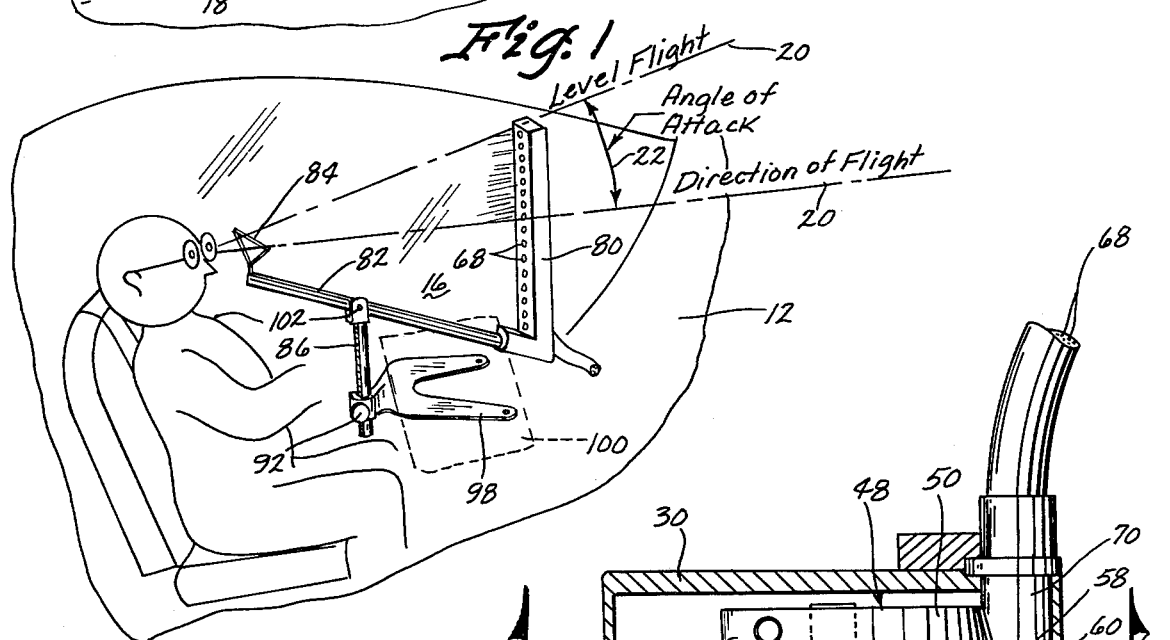
FIG. 2 is a perspective view showing the optical indicator and sighting device supported within the airplane cockpit area.

In FIGS. 6 and 7, it is seen that the console 80 is adjustably supported at one end of an elongated post 82 which carries a sighting device 84 at the opposite end thereof. Post 82 is supported on the upper end of an upright rack 86 which is adjustably movable longitudinally of a collar 88 by a pinion gear 90, rotation of which is controlled by a handle 92. Collar 88 is connected by bolts 94 and 96 to a V-shaped brace 98 adapted to be secured in fixed relation onto the dash 100 (FIG. 2) in the airplane cockpit 16. Referring to FIG. 6, it is to be understood that the axial adjustment of the console 80 relative to post 82 and the pivotal connections at 102 and 94 are to be fixed at the time of installation so that the console 80, post 82 and rack 86 are only adjustable as a unit in the vertical direction by the pinion gear and handle 92.

During installation, the console 80 is adjusted longitudinally of the sighting device 84 so that the difference in angle between lines from the sighting device 84 to the uppermost and lowermost fibers on the console is equal to ten degrees, corresponding to the ten degree spread of the fibers as shown in FIG. 9. Pivotal connections 102 and 94 are adjusted so that the line of sight from the sighting device 84 through the uppermost fiber 40 corresponds to the direction of level flight for the airplane 10.

The indicator unit 28 is so constructed to provide the pilot with a line of sight corresponding to the actual direction of flight regardless of the pitch or angle of attack of the airplane. It is apparent that in the sky there are no trees, buildings or the like near enough to use as reference points for judging the direction of flight, so the only reference is the airplane which may be pointing in a direction entirely different than the line of flight.

It is indicator unit 28 of the present invention which provides an effective reference for determining the direction of flight. It can be seen that once the sighting device 84 is vertically adjusted to comfortably suit a particular pilot, it is fixed relative to the airplane. The height of the column of illuminated fibers in console 80, however, varies with the angle of attack. Referring to FIG. 1, a decrease in the angle of attack effects a counterclockwise pivotal movement of the wind vane 46 and shutter 48 assembly so that the shutter plate 58 is pivoted upwardly exposing more fibers to the light source 64 (FIG. 5). Because of the predetermined arrangement of fibers as discussed above, pivotal movement of the shutter in response to a decreasing angle of attack causes the illumination of fibers to proceed vertically up the console 80. Conversely, pivotal movement of the shutter responsive to increasing angle of attack causes the shielding of fibers to proceed vertically down the console 80 decreasing the height of the illuminated column. As a result, the line of sight between sighting device 84 and the uppermost illuminated fiber corresponds to the actual direction of flight of the airplane.

The airplane angle of attack indicator 24 of the present invention gives the pilot the two main items of information that are needed for a proper and safe visual landing, namely, the angle of attack indication to keep the speed correct and the direction of flight indication to assure that he descends along the proper path to allow the airplane to touch down at the correct point on the runway. Thus there has been described an angle of attack indicator which accomplishes at least all of the stated objects.

We claim:

1. In combination with an airplane having a fuselage and a cockpit area, a device for indicating the angle of attack of the airplane comprising,
air actuated means in communication with air outside said fuselage and being responsive to the angle of attack of the airplane moving through the air,
a light source mounted on said airplane,
a plurality of optical fibers on said airplane, each having one end thereof positioned for exposure to said light source,
a light shield means supported on said airplane for movement intermediate said light source and said one end of said optical fibers for varying the number of optical fibers exposed to said light source,
means connecting said light shield means and said air actuated means such that the position of said light shield means between said light source and optical fibers is responsive to the pivotal position of said air actuated means, and
indicator means in said cockpit area responsive to the illumination of said optical fibers.

2. The combination of claim 1 wherein said air actuated means is a vane means.

3. The combination of claim 2 wherein said vane means is supported for pivotal movement about a generally horizontal axis extended transversely from said fuselage.

4. The combination of claim 1 wherein said light shield means is supported for pivotal movement in unison with said air actuated means about the same axis.

5. The combination of claim 4 wherein counterweight means are secured to said axis so as to free said air actuated means from gravitational forces affecting the pivotal position thereof.

6. The combination of claim 1 wherein said one ends of the optical fibers are arranged in a predetermined pattern so as to be sequentially illuminated in response to pivotal movement of said light shield means.

7. The combination of claim 6 wherein said one ends of the optical fibers are arranged in radially spaced rows relative to said axis with the fibers in each row circumferentially staggered relative to the fibers of adjacent rows.

8. The combination of claim 5 wherein the other ends of said optical fibers are supported at said indicator means and arranged in the sequence of illumination of said one ends.

9. The combination of claim 8 wherein said indicator means includes a support member, said other ends of the optical fibers being vertically disposed on said member with respect to each other.

10. The combination of claim 9 wherein said other ends of the optical fibers are arranged such that as said light shield means pivots in response to a change in angle of attack, the illumination of said other ends of the optical fibers proceeds vertically with respect to said support member.

11. The combination of claim 1 further comprising a sighting device arranged in relation to said indicator means such that a line of sight may be established through said sighting device and said indicator means, said line of sight corresponding to the vertical direction of flight of said airplane.

12. The combination of claim 11 wherein said sighting device and indicator means are vertically adjustable in unison to keep the varying line of sight at the pilot's eye level.

13. The combination of claim 1 further comprising a sighting device arranged in fixed relation to said indicator means such that a line of sight may be established through said sighting device and said indicator means, said line of sight corresponding to the vertical direction of flight of said airplane.

14. The method of determining the angle of attack of an airplane having an airplane control center with respect to the direction of flight, comprising,
measuring the angle of attack of the airplane at the exterior of the airplane,
providing a light shield means movably responsive to the changes in the angle of attack measured at the exterior of the airplane, providing elongated optic fibers from the area of said light shield means to said control center, providing a light source adjacent said light shield means whereby said light shield means will interrupt or permit the passage of light from said light source to the ends of said optic fibers adjacent said light shield means in response to the measurement of said angle of attack, and whereby the magnitude of said angle of attack can be visually observed from the illuminated ends of the optical fibers adjacent said control center.

15. The method of claim 14 wherein said optical fibers are arranged in a predetermined pattern so as to be sequentially illuminated in response to movement of said light shield means.

16. The method of claim 13 wherein said optical fibers are supported at said control center and arranged in a vertical sequence of illumination.

17. The method of claim 14 comprising the further steps of determining the vertical direction of flight of said airplane by sighting through a sight means and certain of the illuminated ends of the optical fibers adjacent said control center to establish a line of sight corresponding to the vertical direction of flight of said airplane.

18. In combination with an airplane having a fuselage and a cockpit area, a device for determining the vertical direction of flight of the airplane comprising, air actuated means is communication with air outside said fuselage and being responsive to the angle of attack of the airplane moving through the air, visible indicator means in said cockpit area, means connecting said air actuated means and said visible indicator means whereby changes in the angle of attack of the airplane moving through the air can be visually observed on said visible indicator means, and a sighting device in said cockpit area arranged in relation to said indicator means such that a line of sight may be established through said sighting device and said indicator means, said line of sight corresponding to the vertical direction of flight of said airplane.

19. The combination of claim 18 wherein said sighting device and indicator means are vertically adjustable in unison to keep the varying line of sight at the pilot's eye level.

20. The method of determining the vertical direction of flight of an airplane having an airplane control center with respect to the direction of flight, comprising, measuring the angle of attack of the airplane at the exterior of the airplane, providing means movably responsible to the changes in the angle of attack measured at the exterior of the airplane, visually projecting the angle of attack of said airplane at said airplane control center on an indicator means, and sighting through a sight means and said indicator means to establish a line of sight corresponding to the vertical direction of flight of said airplane.

* * * * *